J. J. D. KINGSBURY.
Thill-Coupling.
No. 204,494. Patented June 4, 1878.
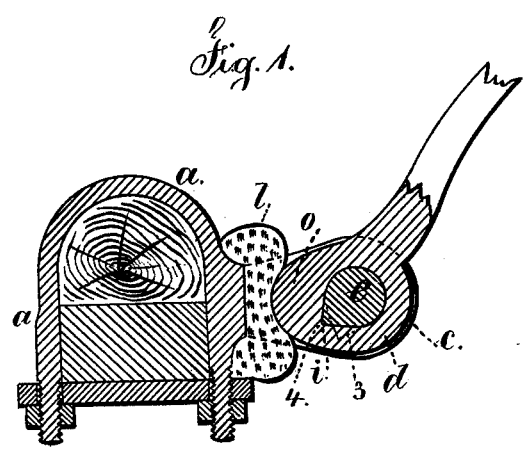
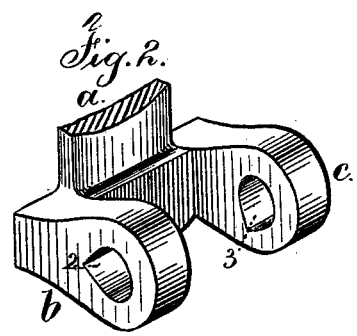

UNITED STATES PATENT OFFICE.

JOHN J. D. KINGSBURY, OF EAST BLOOMFIELD, NEW YORK.

IMPROVEMENT IN THILL-COUPLINGS.

Specification forming part of Letters Patent No. 204,494, dated June 4, 1878; application filed November 19, 1877.

*To all whom it may concern:*

Be it known that I, JOHN J. D. KINGSBURY, of East Bloomfield, in the county of Ontario and State of New York, have invented an Improvement in Thill-Couplings, of which the following is a specification:

Thill-couplings have been made in which there is a key upon the pin that passes through the jaws and eye, the jaw and eye being slotted at one side of the holes for the said key, and the eye has been made eccentric to compress the rubber as the shafts are moved to their normal position for use.

My improvement is made for allowing the coupling-pin to be driven out or introduced when the shafts are raised above or pressed below their normal condition of use; but when in the position for use said pin cannot be driven out, and the rattling of the joint is prevented by the rubber that is compressed by the eccentric-eye. By this construction the shafts can be held up by the key of the pin, when said pin is partially driven out after the shafts have been raised.

In the drawing, Figure 1 is a vertical section of the thill-coupling. Fig. 2 is a perspective view of the jaws with the eye removed, and Fig. 3 is a side view of the joint-pin.

The clip $a$ is of any desired character, and at one side thereof are the jaws $b$ $c$, adapted to receive between them the eye $d$ of the shaft-iron.

The pin $e$ is made without any head, and is cylindrical, except at one side, where there is a key or feather, $i$, of a length slightly less than the distance between the jaws $b$ $c$, and it is preferable to make this feather in a V shape, as shown.

In the jaws $b$ and $c$ and in the eye $d$ the holes are of a size to receive the pin $e$, and each is slotted at one side for the key or feather $i$.

The slot 2 in the eye $b$ is not in line with the slot 3 in the eye $c$, and the position of these slots to the slot 4 in the eye $d$ is such that when the shafts are lowered the key $i$ on the pin $e$ will pass through the slot 2 into the slot 4. Hence, when the shafts are raised to their normal position of use, the pin $e$ cannot be withdrawn, because its feather is between the jaws $b$ $c$, and not in line with the slots in either. If the shafts are raised the slot 3 in the eye $c$ and key $i$ are brought into line with the slot 4 in the eye $d$. Hence the pin $e$ can be driven out, or if driven partially out the shafts will be held up, because the key $i$ will be in both the shaft-iron eye $d$ and in the eye $c$. The shafts can be easily connected or disconnected either above or below their normal position of use, but while in that position of use the joint-pin cannot be driven out.

The cam projection $o$ at one side of the eye $d$ serves to compress the block of rubber or other yielding material, $l$, when the shafts are in the position of use, and to relieve the pressure when the shafts are raised or lowered, so as to render the insertion or withdrawal of the pin easy.

I claim as my invention—

The thill-coupling having slots in both the jaws, the slot in one jaw being in a different position from that in the other, in combination with the shaft-iron and the pin having a key or feather at one side, substantially as set forth, whereby the pin can be inserted when the shafts are either elevated or depressed, as set forth.

Signed by me this 12th day of November, A. D. 1877.

JOHN J. D. KINGSBURY.

Witnesses:
 GEO. T. PINCKNEY,
 WILLIAM G. MOTT.